July 2, 1968

H. L. DOBRIKIN 3,390,920

DUAL APPLICATION VALVE

Filed Nov. 18, 1966

INVENTOR.
Harold L. Dobrikin,
BY Parker & Carter
Attorney.

United States Patent Office 3,390,920
Patented July 2, 1968

3,390,920
DUAL APPLICATION VALVE
Harold L. Dobrikin, Highland Park, Ill., assignor to Berg Mfg. & Sales Co., Des Plaines, Ill., a corporation of Illinois
Filed Nov. 18, 1966, Ser. No. 595,400
1 Claim. (Cl. 303—52)

ABSTRACT OF THE DISCLOSURE

A dual brake system application valve wherein movement of a first piston by a brake pedal closes an exhaust passage and opens a first valve member. The first piston has a lost-motion connection with a tubular member which extends through the valve member and produces movement of a second piston after a predetermined movement of the first piston, the second piston opens a second valve and closes an exhaust passage through the second piston, the tubular member being slidable in sealing engagement with an adapter plate fixed in the housing and serving to support the tubular member, the first valve member and as a stop means for the second piston.

This invention relates to vehicle fluid brake systems and has particular relation to an application valve therefor.

One purpose of the invention is to provide a single valve structure effective to deliver fluid pressure to dual sets of brakes.

Another purpose is to provide a dual brake application valve having means productive of uniform application of fluid pressure to the brakes of a dual brake set.

Another purpose is to provide a valve effective to activate either brake system though the other system be inoperative.

Another purpose is to provide a dual brake application valve effective to exhaust the brake systems connected thereto through a single valve exhaust outlet.

Another purpose is to provide a dual brake application valve having means for directing fluid pressure to the dual brakes of a vehicle and of modulating said delivery in response to the resistance of a single spring.

Another purpose is to provide a dual brake application valve having parts movable to exhaust position at the same predetermined fluid pressure.

Other purposes will apear from time to time during the course of the specification and claim.

The invention is illustrated more or less diagrammatically in the accompanying drawings, wherein.

Like parts are indicated by like numerals throughout the specification and drawing.

Figure 1:
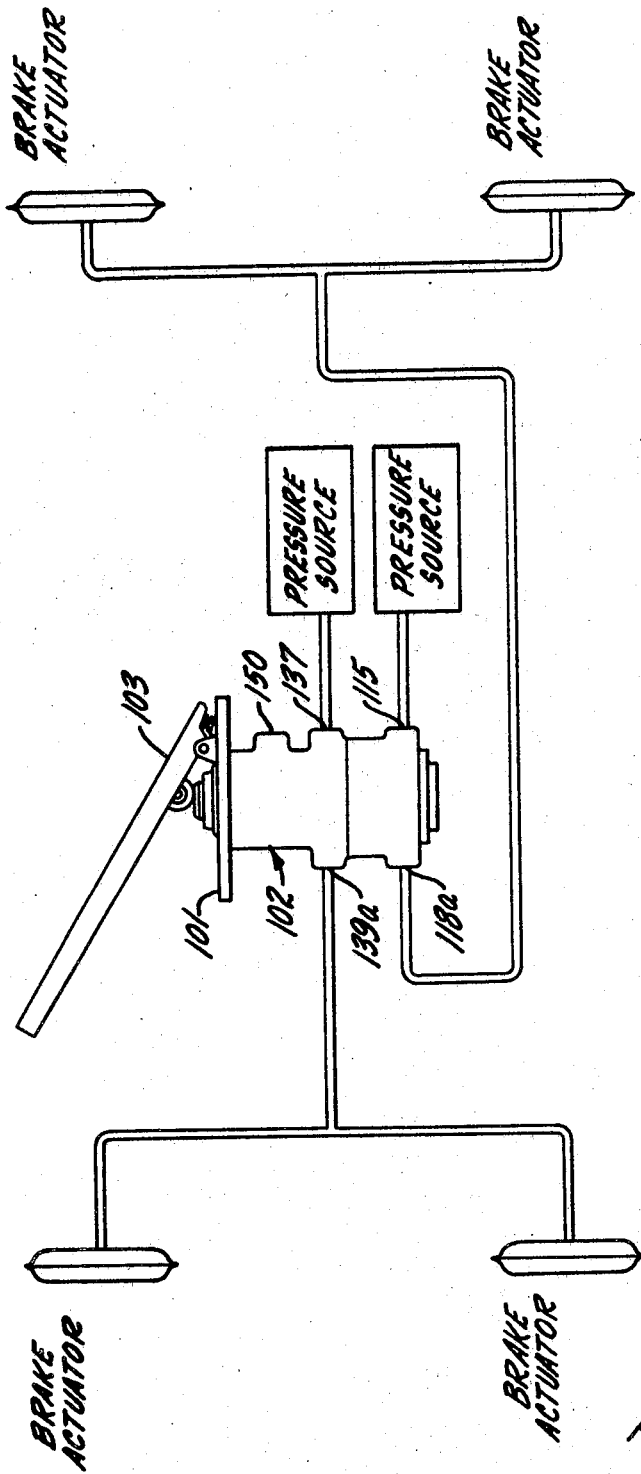
FIGURE 1 is a schematic view of a dual brake system.

Referring now to the drawing, a mounting plate 101 pivotally supports thereon a brake pedal 103 having a foot-engageable portion 104 and yieldingly urged toward the position shown in the figure by yielding means 105 which engages plate 101 and pedal 103. Pedal 103 carries the roller 106 which in turn engages a plug 107 movable in aperture 108 in plate 101. Indicated at 109 is a dust jacket engaging plate 101 and the plug 107.

Secured to the opposite surface of plate 101 and depending therefrom, as the parts are shown in the drawing, is a housing 102 composed of the two housing parts 110, 111. Carried in housing part 110 and extending into housing part 111 is a cup-shaped plate and sleeve member 112. A major annular or plate portion of member 112 is secured between ribs 112a and a split ring retaining member 112b.

Indicated at 115 is a first fluid pressure inlet communicating with a first service chamber 116 formed in housing part 111. A passage 117 communicates chamber 116 with a first operating chamber 118 which in turn communicates with a first fluid pressure outlet 118a. A valve member 120 is slidable in chamber 116. Valve 120 carries in its upper surface a first annular service valve face member 120a which seats upon a valve seat 120b when the valve member 120 is urged into the position shown in the drawing by spring 121. The valve face member 120a may conveniently take the form of an O-ring held within a groove in the upper annular face of valve member 120. A similar O-ring, of lesser diameter, is held within the said annular face of valve member 120 to constitute a first exhaust valve face member, as indicated at 124. An axial passage 120c is formed in valve member 120 to communicate the areas on opposite sides thereof.

A piston 122 is slidable at one end of chamber 118 and carries seal 122a to seal chamber 118 against communication with the area on the opposite side of piston 122. A central axial extension 122b is formed on piston 122, the annular outer face of which extension constitutes a first exhaust valve seat 125 positioned for movement through passage 117 and for engagement with exhaust valve face 124. Extension 122b carries axial exhaust passage 126 therein. Spring 130 is positioned in chamber 118 to urge piston 122 away from valve 120.

The adapter plate or fitting 112 is, as above indicated, generally cup-shaped and has its bottom wall centrally apertured, as indicated at 131, wherein seal 132 is retained. A second valve member 134 has a cylindrical extension 134b slidable reciprocally in the cup portion of member 112 and yielding means 134c are positioned in said cup portion to engage valve member 134 and to urge it toward a valve seat 135, as shown in the drawing. In such position a second service valve face member 134d engages seat 135. A second exhaust valve face member 134e is carried in the upper annular face of member 134, the valve members 120 and 134 being substantially identical.

A second fluid pressure inlet 137 communicates with a second service chamber 136 for delivery of service fluid pressure thereto. A passage 138 is formed in housing part 110 to communicate chamber 136 with a second operating chamber 139 which in turn communicates with a second fluid pressure brake system outlet 139a.

Slidable in housing part 110 is a cup-shaped operating piston member 144 which is urged away from valve member 134 by spring 143. Piston 144 carries an axial extension 144a movable in passage 138 and carrying the outer annular valve seat surface 146 for engagement with exhaust valve member 134e.

Seals 144b are carried by piston 144 to seal chamber 139. An exhaust passage 147 is formed through the bottom wall of piston 144 and extension 144a and communicates with a chamber 148 formed within the cup-shaped piston 144. The circumferential wall of piston 144 is apertured as indicated at 149 for communication of the chamber 148 with a valve housing exhaust port 150. A yielding member, such as the spring 151, is positioned in chamber 148 with one of its ends in engagement with the inner surface of the bottom wall of piston 144 and its opposite end in engagement with a retainer cap 152. The cap 152 is in turn secured to plug 107, as indicated at 153, and is held within piston 144 by split retainer ring 154.

A hollow tubular member or shaft 160 has one of its ends secured within piston 122, as indicated at 161. Shaft 160 extends through aperture 131 in member 112 in sealing engagement with the seal 132 carried thereby and shaft member 160 extends through spring 134c and the passage 134f in valve member 134, the upper end, as the parts are shown, of member 160 being slidably received within an enlarged lower portion of the exhaust passage 147 formed in piston extension 144a. Circumferentially spaced apertures 162 are formed in member 160 in substantially planar alignment with passage 138, when the parts are positioned as shown, to communicate the area within the member 160 with passage 138 and chamber 139 when the parts are in such position.

The area above piston 122, as indicated at 122c, is communicated with chamber 139 by a passage 155 formed in housing part 110.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

It will be understood that fluid pressure is present at inlets 115, 137 and that outlets 118a, 139a are, respectively, each connected to and in communication with a separate brake system.

The operator, wishing to apply the vehicle brakes, presses downwardly on surface 104 of pedal 103, producing, through the mediacy of roller 106, plug 107 and cap 152, a downward pressure on spring 151 and movement of piston 144 downwardly as the parts are shown in the drawing. As piston 144 continues to move downwardly a shoulder, produced by the reduction in exhaust passage 147, engages the upper end of hollow shaft 160 and valve face 146 on the end of piston extension 144 engages valve face surface 134e. At this point the area within shaft 160 is closed against communication with passage 138 and chamber 139, since the extension 144a slides over said apertures and the engagement of seat surface 146 with valve face member 134e precludes such communication. Thus, also, chamber 139 is closed against any communication with atmosphere. Continued downward movement of piston 144 produces a corresponding movement of valve member 134 and a consequent unseating of valve face member 134d from the valve seat 135. At the same time, through the mediacy of shaft 160, piston 122 is moved downwardly to move extension 122b through passage 117, to bring exhaust valve seat 125 into engagement with exhaust valve face member 124, thus closing chamber 118 against communication with atmosphere, and to move valve member 120 correspondingly to unseat service valve face member 120a from valve seat 120b.

With the first and second service valve face members 120a, 134d thus unseated, the fluid pressure at inlet 115 moves through passage 117, chamber 118 and outlet 118a to apply the set of brakes in communication therewith and the fluid pressure at inlet 137 moves through passage 138, chamber 139 and outlet 139a for application of fluid pressure to the brake set in communication therewith. With fluid pressure delivered to chamber 139, the same is communicated through passage 155 to chamber 122c above piston 122 to equalize and balance the pressures throughout the operation of the device of the invention.

When the operator wishes to release brake pressure, he merely withdraws foot pressure on surface 104 of pedal 103, whereupon the fluid pressure present in chambers 118, 139, respectively, is effective to urge pistons 122 and 144, respectively, upwardly toward the position shown in the drawing, aided by springs 130, 143. With the consequent unseating of valve seats 125, 146 of pistons 122, 144 the chambers 118, 139 are opened to exhaust to atmosphere. Chamber 118 is exhausted through passage 117, passage 126, hollow shaft 160, passage 147, chamber 148, outlet 149 and housing outlet 150. Chamber 139 is exhausted through passage 138, apertures 162, shaft 160, passage 147, chamber 148, outlet 149 and housing outlet 150. At the same time chamber 122c is exhausted through passage 155, chamber 139, passage 138, apertures 162, shaft 160, passage 147, chamber 148, outlet 149 and housing outlet 150. Yielding means 121 and 134c are effective, respectively, to return the valves 120, 134 to the position shown in the drawing and thus to close inlets 115, 137 and chambers 116, 136 against communication with outlets 118a, 139a or with exhaust outlet 150.

Figure 2:
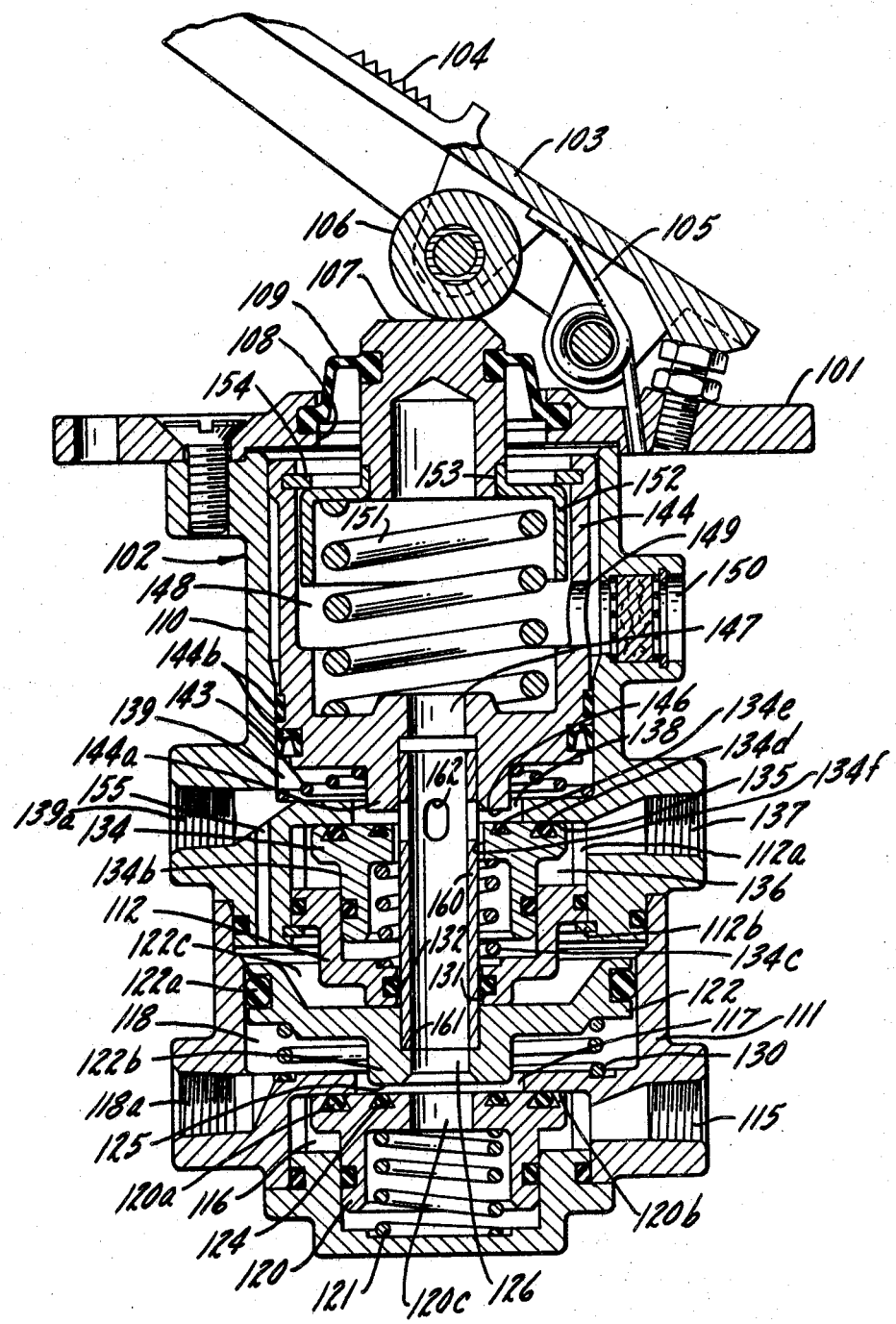
FIGURE 2 is a side view of the valve in cross section.

The dual brake system, of which the valve of FIGURE 2 is a part, is illustrated more or less schematically in FIGURE 1. It will be observed that each system includes an independent source of fluid pressure. Suitable conduit communicates one of said sources to inlet 115 and communicates outlet 118a with one set of brake actuators. Similarly, the other fluid pressure source is communicated with inlet 137 and outlet 139a is communicated with the other set of brake actuators. Various accessory elements, such as check valves, relay valves and the like are not illustrated, but it will be understood that suitable accessory elements may be employed as desired without departing from the nature and scope of the invention herein. As is clear from an understanding of the valve structure depicted in FIGURE 2, the two brake systems are entirely independent of each other. Thus a failure or leak in the pressure source, the conduit upstream of the valve, the conduit downstream thereof or in the brake actuators of one system will in no manner prevent or impede the full operation of the other brake system. Thus a single actuation of the foot-operated pedal 103 is effective to apply actuating pressure to one or both brake actuator sets and to exhaust one or both brake actuator sets, neither of said sets being affected by the condition of the other.

There is claimed:

1. A brake application valve including a housing, a first inlet and outlet in said housing, a second inlet and outlet in said housing, a first valve controlling communication between said first inlet and outlet, a second valve controlling communication between said second inlet and outlet, an exhaust outlet in said housing, a first piston having an extension movable against said first valve to open said first valve, a second piston having an extension movable against said second valve to open said second valve, an exhaust passage in said first piston extension, an exhaust passage in said second piston extension, a hollow tubular member secured to one of said piston extensions and slidable in the other of said piston extensions to communicate said exhaust passages, a cup-shaped adapter plate fixed in said housing between said first and second inlets and outlets, said tubular member being slidable through said adapter plate in sealing engagement therewith, the movable portion of said first valve being slidable in said adapter plate cup-shaped portion, an abutment surface on said adapter plate serving as a stop means for said second piston, limiting the movement of said second piston away from said second valve.

References Cited

UNITED STATES PATENTS 3,219,396 11/1965 Bueler _____ 303—52
3,266,850 8/1966 Herold _____ 303—52

FOREIGN PATENTS 811,466 4/1959 Great Britain.

MILTON BUCHLER, *Primary Examiner.*

J. J. McLAUGHLIN, *Assistant Examiner.*